(12) United States Patent
Hashimoto et al.

(10) Patent No.: US 10,896,278 B2
(45) Date of Patent: Jan. 19, 2021

(54) SUPPORT METHOD, AND INFORMATION PROCESSING APPARATUS

(71) Applicant: FUJITSU LIMITED, Kawasaki (JP)

(72) Inventors: Michitaka Hashimoto, Kawasaki (JP); Ryo Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/789,008

(22) Filed: Oct. 20, 2017

(65) Prior Publication Data
US 2018/0129771 A1 May 10, 2018

(30) Foreign Application Priority Data
Nov. 7, 2016 (JP) .................................. 2016-217636

(51) Int. Cl.
*G06F 30/34* (2020.01)
*G06F 111/04* (2020.01)

(52) U.S. Cl.
CPC .......... *G06F 30/34* (2020.01); *G06F 2111/04* (2020.01)

(58) Field of Classification Search
CPC ........................ G06F 17/5045; G06F 17/5054
See application file for complete search history.

(56) References Cited

U.S. PATENT DOCUMENTS

2016/0232269 A1 * 8/2016 Rajagopalan ....... G06F 17/5036
2016/0253445 A1 * 9/2016 Pataky .................. G06F 17/505
716/104

FOREIGN PATENT DOCUMENTS

JP          4-199369         7/1992
JP          2016-1381        1/2016

* cited by examiner

*Primary Examiner* — Jack Chiang
*Assistant Examiner* — Aric Lin
(74) *Attorney, Agent, or Firm* — Staas & Halsey, LLP

(57) ABSTRACT

An information processing apparatus includes a processor configured to accept feature information on a specification of a target circuit to be designed. The processor is configured to refer to first correspondence information in which a plurality of parameter values are associated with respective index values for each piece of feature information on specifications of respective circuits to be configured in an integrated circuit. The processor is configured to calculate, for each of a plurality of combinations of parameter values related to the accepted feature information, a sum of the index values associated with respective parameter values included in the relevant combination of parameter values. The processor is configured to select one or more combinations of parameter values from among the plurality of combinations of parameter values on basis of the calculated sums. The processor is configured to output the selected combinations of parameter values.

5 Claims, 13 Drawing Sheets

FIG. 4

| DESIGN FEATURE | | | | | EXPECTED CORRECT SOLUTION | | | | |
|---|---|---|---|---|---|---|---|---|---|
| | | | | | LOGIC SYNTHESIS RELATED PARAMETER | | | PHYSICAL PARAMETER | |
| DEVICE NAME | MAXIMUM CLOCK FREQUENCY [MHz] | NUMBER OF CLOCKS | MAXIMUM NUMBER OF LOGIC STAGES | USAGE RATE | Synth Effort | Timing Driven | Remove Duplicate Registers | Fitter Effort | Physical Synth |
| AB | 100 OR LESS | 5 OR LESS | 10 OR LESS | LESS THAN 50 | Auto (10) | On (2) | On (8) | Auto (11) | Normal (3) |
| | | | | | Fast (1) | Off (9) | Off(3) | Standard (0) | Fast (5) |
| | | | | | | NONE | | | Extra (2) |
| | | | | 50 OR MORE | Auto (0) | On (1) | On (2) | Auto (11) | Normal (0) |
| | | | | | Fast (11) | Off (10) | Off(5) | Standard | Fast (2) |
| | | | | | | NONE | | | Extra (9) |
| | | | 10 TO 20 | LESS THAN 50 | Auto (0) | On (0) | On (0) | Auto (11) | Normal (0) |
| | | | | | Fast (11) | Off (11) | Off(5) | Standard (0) | Fast (0) |
| | | | | | | NONE | | | Extra (11) |
| | | | | 50 OR MORE | Auto (0) | On (0) | On (0) | Auto (10) | Normal (0) |
| | | | | | Fast (11) | Off (11) | Off(7) | Standard (0) | Fast (0) |
| | | | | | | NONE | | | Extra (11) |

FIG. 5

| PARAMETER | AREA/POWER CONSUMPTION PRIORITY | TIMING PRIORITY |
|---|---|---|
| Remove Duplicate Registers | On | Off |
| Auto Register Duplication | Off | On |

EXPECTED CORRECT SOLUTION

| DEVICE NAME | DESIGN FEATURE ||||  LOGIC SYNTHESIS RELATED PARAMETER ||| PHYSICAL PARAMETER ||
|---|---|---|---|---|---|---|---|---|---|
| | MAXIMUM CLOCK FREQUENCY [MHz] | NUMBER OF CLOCKS | MAXIMUM NUMBER OF LOGIC STAGES | USAGE RATE | Synth Effort | Timing Driven | Remove Duplicate Registers | Fitter Effort | Physical Synth |
| AB | 100 OR LESS | 5 OR LESS | 10 OR LESS | LESS THAN 50 | Auto (10) | On (2) | On (8) | Auto (11) | Normal (3) |
| | | | | | Fast (1) | Off (9) | Off (3) | Standard (0) | Fast (5) |
| | | | | | NONE |||| Extra (2) |

⇨

ASSUMED EXPECTED CORRECT SOLUTION

| LOGIC SYNTHESIS RELATED PARAMETER ||| PHYSICAL PARAMETER || TOTAL VOTE COUNT |
|---|---|---|---|---|---|
| Synth Effort | Timing Driven | Remove Duplicate Registers | Fitter Effort | Physical Synth | |
| Auto (10) | Off (9) | On (8) | Auto (11) | Fast (5) | 43 |
| Auto (10) | Off (9) | On (8) | Auto (11) | Normal (4) | 42 |
| Auto (10) | Off (9) | On (8) | Auto (11) | Extra (2) | 40 | ns and# SUPPORT METHOD, AND INFORMATION PROCESSING APPARATUS

CROSS-REFERENCE TO RELATED APPLICATION

This application is based upon and claims the benefit of priority of the prior Japanese Patent Application No. 2016-217636, filed on Nov. 7, 2016, the entire contents of which are incorporated herein by reference.

FIELD

The embodiment discussed herein is related to a design support method and an information processing apparatus.

BACKGROUND

A field programmable gate array (FPGA) has been known as an integrated circuit in which a purchaser or a designer may set a desired circuit configuration after the manufacture of the integrated circuit. As a method of setting a circuit configuration in the FPGA, there has been known a technique of logically synthesizing a netlist in which a function of a circuit (target circuit) to be designed is described in a hardware description language, and performing layout on the FPGA in accordance with the netlist of a gate level obtained by the logical synthesis. After the circuit is configured in the FPGA, it is checked whether a performance factor such as a timing, an area, a power consumption, or the like satisfies a constraint.

The setting of a circuit configuration in the FPGA and the check on whether the performance factor of the circuit configured in the FPGA satisfies the constraint are performed by, for example, an application program provided by a supplier of the FPGA. For example, when values are set for various parameters provided by the application program, the application program causes a target circuit to be configured in the FPGA. The values that may be set for the various parameters are provided by the supplier of the application program, or the like.

As a related art, there is a technique of extracting features of logic circuits and classifying the logic circuits by the types on the basis of the features, performing optimization of the classified logic circuits using a conversion rule corresponding to a classification result, and learning the classification processing according to the features of the logic circuits.

Further, there is a technique for calculating parameters used for simulation of a flight trajectory on the basis of a wing theory, on the basis of learning data obtained by machine learning using data of flight trajectories of a plurality of flying objects having different wings and input data on the wing shape of a flying object.

Related techniques are disclosed in, for example, Japanese Laid-Open Patent Publication No. 04-199369 and Japanese Laid-Open Patent Publication No. 2016-001381.

SUMMARY

According to an aspect of the present invention, provided is an information processing apparatus including a memory and a processor coupled to the memory. The processor is configured to accept feature information on a specification of a target circuit to be designed. The processor is configured to refer to first correspondence information in which a plurality of parameter values are associated with respective index values for each piece of feature information on specifications of respective circuits to be configured in an integrated circuit. The parameter values are alternatives of values to be set for respective parameters used for causing each of the circuits to be configured in the integrated circuit. The index values are related to use of the respective parameter values. The processor is configured to calculate, for each of a plurality of combinations of parameter values related to the accepted feature information, a sum of the index values associated with respective parameter values included in the relevant combination of parameter values. The processor is configured to select one or more combinations of parameter values from among the plurality of combinations of parameter values on basis of the calculated sums. The processor is configured to output the selected combinations of parameter values as candidates for a combination of parameter values to be set for the parameters.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a machine learning DB;

FIG. 5 is a diagram illustrating an example of a parameter conversion table;

FIG. 9 is a diagram illustrating an example of calculation and sorting of total vote counts;

DESCRIPTION OF EMBODIMENT

It may be difficult to set a value for a parameter, among values that may be set for the parameter, so as to allow the performance factor of the target circuit to satisfy a constraint. For example, setting an optimum value for the parameter, among a plurality of values, may be difficult depending on the proficiency of a designer. Further, it takes time to set values selected for parameters and to cause the target circuit to be configured in the FPGA. Thus, it may be difficult to cause the target circuit to be configured in the FPGA by sequentially setting each of the plurality of values for the parameters until the performance factor of the target circuit satisfies the constraint.

Hereinafter, an embodiment will be described in detail with reference to accompanying drawings.

Figure 1:
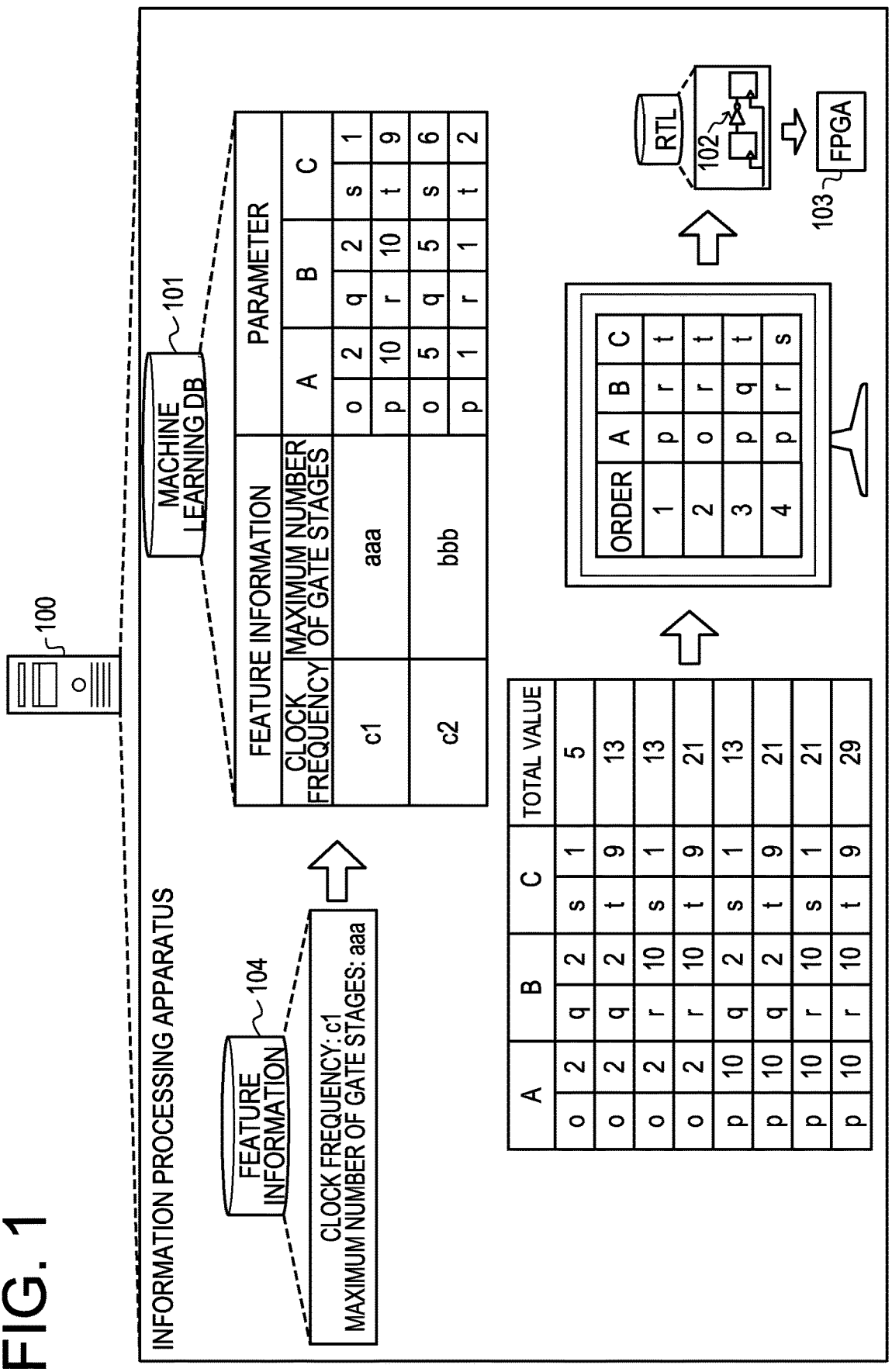
FIG. 1 is a diagram illustrating an exemplary operation of an information processing apparatus.

FIG. 1 is a diagram illustrating an exemplary operation of an information processing apparatus. An information processing apparatus 100 is a computer that supports a design in which a target circuit is configured in an FPGA. The information processing apparatus 100 may be a server, a personal computer (PC), or the like, but is not particularly limited thereto.

As described above, in the related art, in order to configure a target circuit in an FPGA using an application program provided by a supplier or the like of the FPGA, a designer sets a value for each parameter of the application program.

In recent years, depending on a value set for a parameter, a performance factor of a target circuit configured in an FPGA does not satisfy a constraint of a design in some cases, due to a scale increase, a speed increase, etc. of the target circuit. Thus, it may be difficult to set a value for a parameter, among values that may be set for the parameter, so as to allow the performance factor of the target circuit to satisfy a constraint. For example, setting an optimum value for the parameter, among a plurality of values, may be difficult depending on the proficiency of a designer. For example, it takes a long time (e.g., about one day in some cases) to set values for parameters and to configure a target circuit in an FPGA once, even though the time varies depending on the performance of a computer executing an application program. There are about 60 types of parameters, and seven values may be set for some parameters. Thus, it may be difficult to use a technique of causing the target circuit to be configured in the FPGA by sequentially setting each of a plurality of values, which may be set for each parameter, for the parameter until the performance factor of the target circuit satisfies the constraint.

Therefore, the information processing apparatus 100 refers to index values of respective parameter values of an FPGA, which are stored in a machine learning database (DB) and correspond to circuit features, to output a combination of parameter values, which serves as a candidate for an optimal solution, on the basis of respective total index values calculated for a plurality of combinations of parameter values. This may facilitate acquisition of an optimal solution that allows a performance factor of a target circuit to satisfy a constraint among a plurality of values that may be set for the respective parameters. In addition, obtaining an optimal solution may be facilitated regardless of the proficiency of a designer.

First, a storage unit (not illustrated in FIG. 1) stores therein first correspondence information. The first correspondence information is information in which, for each piece of feature information, each of a plurality of values to be set for each of a plurality of parameters is associated with an index value related to the use of each value. Each of the plurality of values may be used for configuring a circuit in an integrated circuit inside which a circuit that has been designed in the past may be configured. Each piece of feature information relates to a specification of the circuit that has been designed in the past. The first correspondence information is referred to as, for example, a machine learning DB 101. In the present embodiment, as the integrated circuit inside which a circuit may be configured, an FPGA 103 is exemplified, but the integrated circuit is not limited thereto and may be another programmable logic device (PLD) or the like. The feature information is information obtained from, for example, a register transfer level (RTL) netlist, a netlist after logic synthesis, timing constraint information, or the like. In the example of FIG. 1, as the feature information, information such as a clock frequency or a maximum number of gate stages may be exemplified. The feature information may include information such as the type of the FPGA or the number of clocks used in the circuit. Here, the gate is a (macro) cell including a transistor included in a logic circuit. As the gate, an NOR gate, an OR gate, an inverter gate, a buffer gate, a register, or the like may be exemplified. The maximum number of gate stages is a maximum value of the number of stages of gates on a path included in a circuit. The path is, for example, a path between registers, a path from an input terminal to a register, a path from a register to an output terminal, or a path from an input terminal to an output terminal.

First, the information processing apparatus 100 accepts feature information 104 related to the specification of a target circuit 102 to be designed. In the example of FIG. 1, the information processing apparatus 100 accepts, as the feature information 104, information indicating a clock frequency and a maximum number of gate stages. In the example of FIG. 1, the feature information 104 indicating a clock frequency of "c1" and a maximum number of gate stages of "aaa" is included in the machine learning DB 101.

Thereafter, the information processing apparatus 100 calculates, for each of a plurality of combinations of parameter values stored in the machine learning DB 101, a total (total index value) of index values associated with the parameter values to be set for the respective parameters included in the combinations with respect to the accepted feature information 104. The combinations of parameter values are combinations of values that may be set for each of the parameters. In the example of FIG. 1, there are three types of parameters, and the number of values that may be set for each parameter is two. Thus, the number of combinations of parameter values is eight (=2×2×2). The information processing apparatus 100 searches for an index value of each parameter value associated with the accepted feature information 104 by referring to the machine learning DB 101. The information processing apparatus 100 calculates a total index value for each of eight combinations of parameter values.

The information processing apparatus 100 outputs several combinations of parameter values on the basis of the calculated total index value among the plurality of combinations of parameter values. Specifically, the information processing apparatus 100 may output, for example, combinations of parameter values for which the total index value is equal to or larger than a threshold value. The threshold value may be determined in advance by a designer, a developer of the information processing apparatus 100, or the like. Alternatively, the information processing apparatus 100 may output a predetermined number of combinations of parameter values, for example, in descending order of the total index value. In the example of FIG. 1, the information processing apparatus 100 outputs the first to fourth combinations of parameter values in the descending order of the calculated total index value. In the example of FIG. 1, as the output format, an output to a display is exemplified, but the output format is not limited thereto and may be an output to an external device over a network, an output to a storage device, or the like.

This may facilitate quick acquisition of an optimal solution to be set for parameters. In addition, obtaining an optimal solution may be facilitated regardless of the proficiency of a designer.

An application program for configuring a circuit in an FPGA causes the target circuit 102 to be configured in the FPGA 103. The application program may be executed by the information processing apparatus 100, or by an apparatus different from the information processing apparatus 100.

Figure 2:
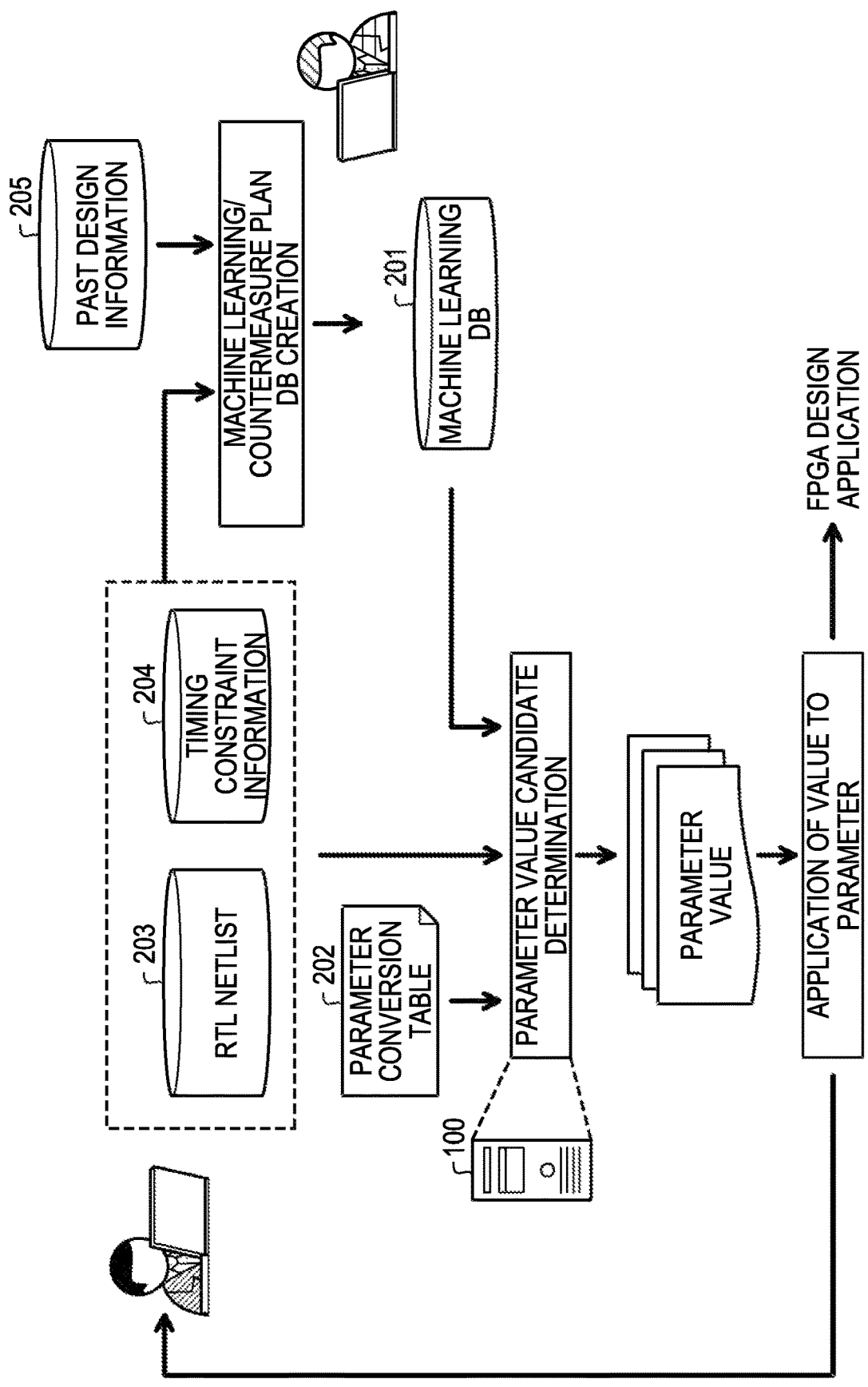
FIG. 2 is a diagram illustrating a design support method according to an embodiment.

FIG. 2 is a diagram illustrating a design support method according to the embodiment. A creator creates a machine learning DB 201 on the basis of past design information 205. The creator may be a provider of the information processing apparatus 100. The creator may be a designer who causes a target circuit to be configured in an FPGA. The designer inputs a newly designed RTL netlist 203, timing constraint information 204, or the like to the information processing apparatus 100.

Then, the information processing apparatus 100 determines a combination of parameter values, which serves as a candidate for an optimal solution, among combinations of values that may be set for each of the plurality of parameters on the basis of the input RTL netlist 203, the input timing constraint information 204, and the created machine learning DB 201. The combination of parameter values, which serves as the candidate for the optimal solution, is also referred to as an expected correct solution. Then, the information processing apparatus 100 applies the expected correct solution to the parameters. Here, applying the expected correct solution to the parameters indicates that a target circuit is caused to be configured in a target FPGA by setting the expected correct solution for the parameters. As described above, the processing of causing the target circuit to be configured in the target FPGA is performed by, for example, an application program capable of causing the target circuit to be configured in the FPGA. The application program may be executed by the information processing apparatus 100 or another apparatus accessible by the information processing apparatus 100.

After completing the design of the target circuit, the designer may update an index value for a value set for each of the plurality of parameters to cause the target circuit to be configured in the FPGA, by referring to the machine learning DB 201. Alternatively, the information processing apparatus 100 may accept an input of a value set for each of the plurality of parameters to cause the target circuit to be configured in the FPGA through an operation by the designer, and update the machine learning DB 201.

Figure 3:
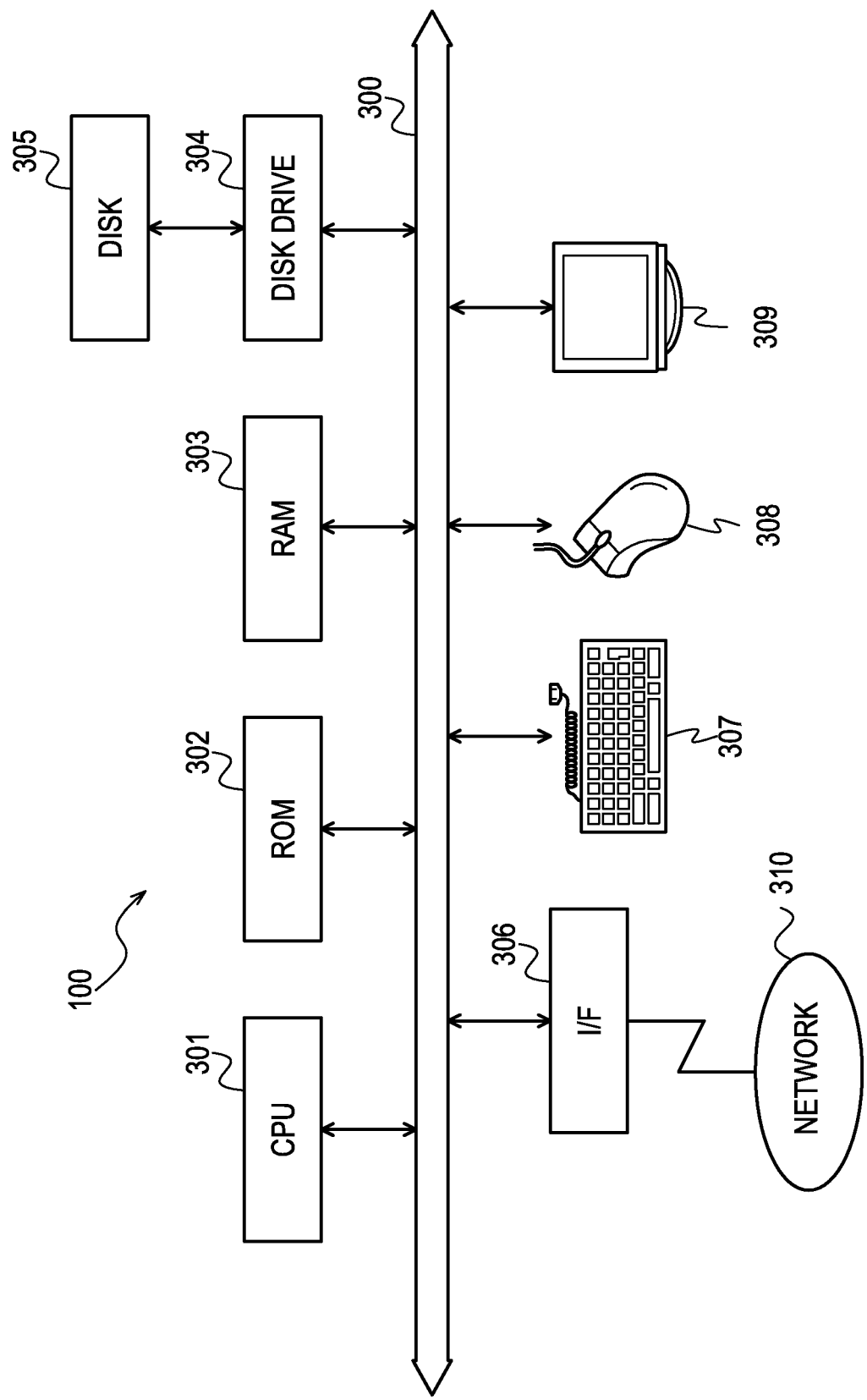
FIG. 3 is a diagram illustrating an exemplary hardware configuration of the information processing apparatus.

FIG. 3 is a diagram illustrating an exemplary hardware configuration of the information processing apparatus. The information processing apparatus 100 includes a central processing unit (CPU) 301, a read-only memory (ROM) 302, a random access memory (RAM) 303, a disk drive 304, and a disk 305. The information processing apparatus 100 includes an interface (I/F) 306, a keyboard 307, a mouse 308, and a display 309. The CPU 301, the ROM 302, the RAM 303, the disk drive 304, the I/F 306, the keyboard 307, the mouse 308, and the display 309 are coupled to each other via a bus 300.

The CPU 301 is in charge of the entire control of the information processing apparatus 100. The ROM 302 stores therein a program such as a boot program. The RAM 303 is used as a work area of the CPU 301. The disk drive 304 controls reading/writing of data from/on the disk 305 under the control of the CPU 301. The disk 305 stores therein data written under the control of the disk drive 304. As the disk 305, a magnetic disk, an optical disk, or the like may be exemplified.

The I/F 306 is coupled to a network 310 such as a local area network (LAN), a wide area network (WAN), or the Internet, through a communication line, and is coupled to another apparatus over the network 310. The I/F 306 is in charge of an interface between the network 310 and the inside, and controls input/output of data from/to an external device. As the I/F 306, for example, a modem, an LAN adapter, or the like may be employed.

The keyboard 307 or the mouse 308 is an interface that accepts input of various data by an operation of a designer or the like. The display 309 is an interface that outputs data in accordance with an instruction from the CPU 301.

Although not illustrated, an input device that accepts images or moving images from a camera or an input device that accepts sounds from a microphone may be provided in the information processing apparatus 100. Although not illustrated, an output device such as a printer may be provided in the information processing apparatus 100.

In the present embodiment, a PC is exemplified as a hardware configuration of the information processing apparatus 100, but the hardware configuration is not limited thereto and may be a server or the like. When the information processing apparatus 100 is a server, a device that may be operated by the designer, the display 309, and the like may be coupled to the information processing apparatus 100 over the network 310.

Hereinafter, storage contents such as various DBs included in the information processing apparatus 100 will be described. Various DBs and the like are implemented by, for example, a storage unit such as the ROM 302, the disk 305, or a nonvolatile semiconductor memory (not illustrated) of the information processing apparatus 100 illustrated in FIG. 3.

FIG. 4 is a diagram illustrating an example of a machine learning DB. The machine learning DB 201 is first correspondence information in which, for each piece of feature information related to the specification of a circuit, each of a plurality of values that may be set for each of a plurality of parameters is associated with an index value related to the use of each value. The machine learning DB 201 corresponds to a detailed example of, for example, the machine learning DB 101 illustrated in FIG. 1. The plurality of parameters are used for causing a circuit to be configured in a target FPGA. The plurality of values that may be set for the parameters are provided by a provider of an application program for causing the circuit to be configured in the FPGA. The index value is a value based on the use frequency of a corresponding value. In the machine learning DB 201, the index value is also referred to as, for example, a vote count.

The machine learning DB 201 includes fields of, for example, "design feature" and "expected correct solution". In the field of "design feature", feature information on the specification of a circuit is set. Specifically, the field of "design feature" includes fields of "device name", "maximum clock frequency", "number of clocks", "maximum number of logic stages", and "usage rate".

In the field of "device name", a name of a target FPGA is set as identification information of the target FPGA. In the field of "maximum clock frequency", a maximum clock frequency among frequencies of clocks supplied to the target circuit is set. In the field of "number of clocks", the number of clocks supplied to the target circuit is set. In the field of "usage rate", a usage rate of the target circuit to the target FPGA when the target circuit is configured in the FPGA is set. In the comparison of the accepted feature information to the feature information stored in the machine learning DB, the usage rate is not compared.

The field of the expected correct solution includes fields of various parameters. In the fields of the various parameters, a value that has been used when a target circuit having the relevant feature information has been designed in the past, among a plurality of values that may be set for the parameter, and an index value related to the use of the value are set. As described above, the index value is also referred to as a vote count. The larger the vote count, the higher the use frequency. The smaller the vote count, the lower the use frequency. In the example of FIG. 4, a parameter value and a vote count are set, as "value (count)", for the fields of the various parameters.

For example, the field of the expected correct solution includes fields of "logic synthesis related parameter" and "physical parameter". In the field of "logic synthesis related parameter", a value that has been used when a circuit having the relevant feature information has been configured in an FPGA in the past is set among a plurality of values that may be set for a parameter related to the logic synthesis. As the logic synthesis related parameters, for example, a parameter "Synth Effort", a parameter "Timing Driven", a parameter "Remove Duplicate Registers", or the like may be exemplified.

In the field of "physical parameter", a value that has been used when a circuit having the relevant feature information has been configured in an FPGA in the past is set among a plurality of values that may be set for a physical parameter. As the physical parameter, for example, a parameter "Fitter Effort", a parameter "Physical Synth", or the like may be exemplified. In FIG. 4, five types of parameters are exemplified, but in actuality, about 60 types of parameters are present.

When the feature information includes the device name "AB", the maximum clock frequency "100 [MHz] or less", the number of clocks "five or less", and the maximum number of logic stages "10 or less", for example, the vote count of "Auto" is 10 in the example of the parameter "Synth Effort".

FIG. 5 is a diagram illustrating an example of a parameter conversion table. A parameter conversion table 202 is second correspondence information in which, for any one of a plurality of parameters, identification information of each of a plurality of performance factors of a circuit is associated with any one of a plurality of values that may be set for the relevant parameter.

Parameters used for an FPGA include settings effective for timing constraints or settings effective for area/power consumption constraints. Among the performance factors of a circuit, the area and the power consumption are in a proportional relationship. The larger the area of a circuit, the larger the power consumption of the circuit. The smaller the area of a circuit, the smaller the power consumption of the circuit. The improvement of performance in the area or the power consumption indicates that the area or the power consumption is reduced. On the other hand, among the performance factors of the circuit, the timing is inversely proportional to the area and the power consumption. As a slack value which is an index value of the timing decreases, the area and the power consumption increase. As the slack value increases, the area and the power consumption decrease.

The parameter conversion table 202 includes fields of "parameter", "area/power consumption priority", and "timing priority". In the field of "parameter", a parameter name is set. In the field of "area/power consumption priority", a value effective for area/power consumption is set among a plurality of values that may be set for the relevant parameter. The effectiveness for area/power consumption indicates that a target circuit is configured in an FPGA such that, for example, the area/power consumption is reduced. In the field of "timing priority", a value effective for timing is set among a plurality of values that may be set for the relevant parameter. The effectiveness for timing indicates that a target circuit is configured in an FPGA such that, for example, a slack value which is an index value of the timing is reduced.

For example, according to the parameter conversion table 202, for the parameter "Remove Duplicate Registers", the value of "area/power consumption priority" is "On", and the value of "timing priority" is "Off". For example, according to the parameter conversion table 202, for the parameter "Auto Register Duplication", the value of "area/power consumption priority" is "Off", and the value of "timing priority" is "On". The parameter "Auto Register Duplication" is omitted in the machine learning DB 201 illustrated in FIG. 4, and also is omitted in the following detailed description.

Figure 6:
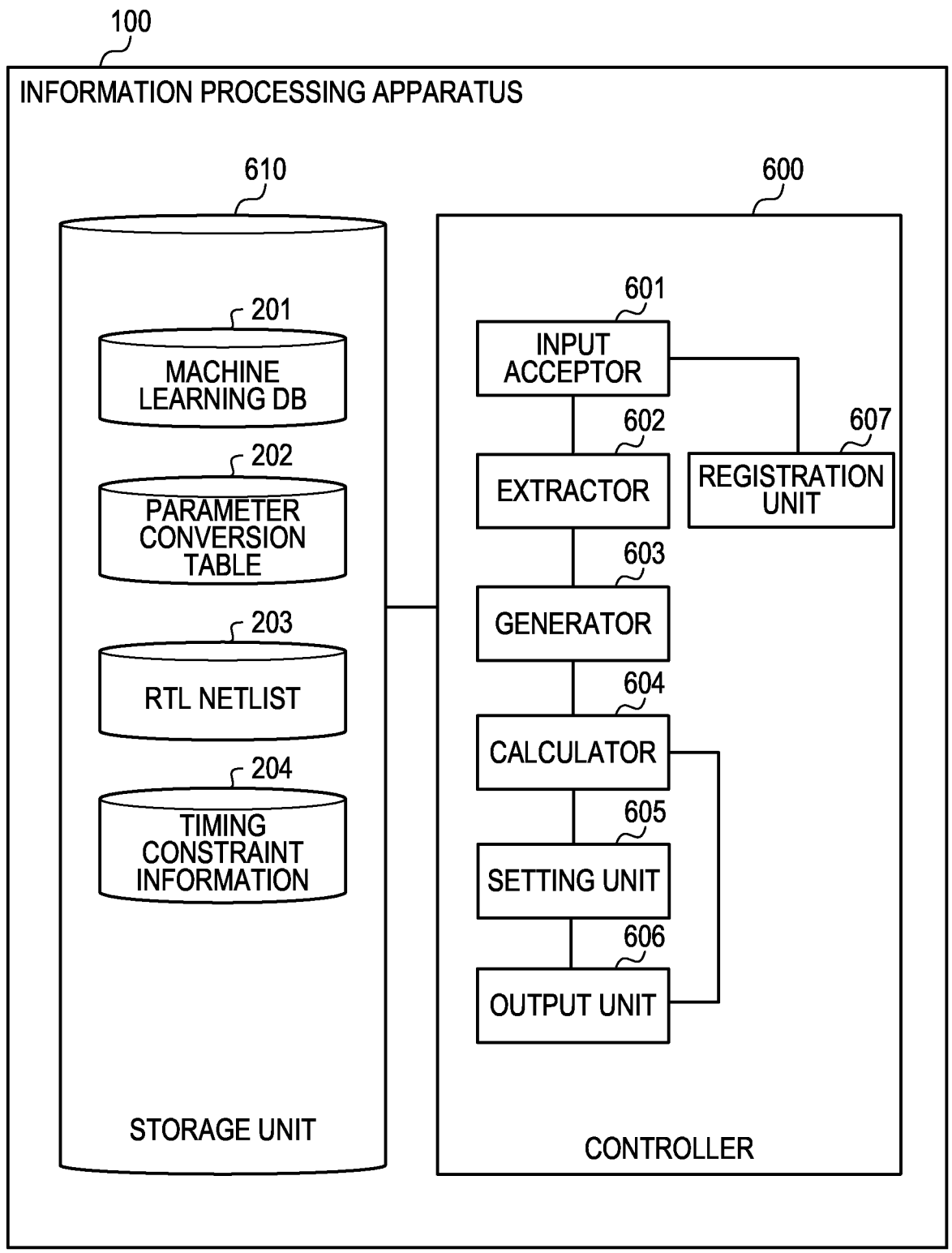
FIG. 6 is a diagram illustrating an exemplary functional configuration of the information processing apparatus.

FIG. 6 is a diagram illustrating an exemplary functional configuration of the information processing apparatus. The information processing apparatus 100 includes a controller 600 and a storage unit 610. The controller 600 includes an input acceptor 601, an extractor 602, a generator 603, a calculator 604, a setting unit 605, an output unit 606, and a registration unit 607. The processing of the controller 600 from the input acceptor 601 to the registration unit 607 is coded in, for example, a program stored in a storage device such as the ROM 302, the RAM 303, or the disk 305 accessible by the CPU 301 illustrated in FIG. 3. Then, the CPU 301 reads the program from the storage device, and performs the processing coded in the program. Accordingly, the processing of the controller 600 is implemented. The processing result of the controller 600 is stored in, for example, the storage device such as the ROM 302, the RAM 303, or the disk 305.

The storage unit 610 stores therein, for example, the machine learning DB 201, the parameter conversion table 202, the RTL netlist 203, and the timing constraint information 204. The storage unit 610 is implemented by a storage device such as the ROM 302, the RAM 303, the disk 305, or a semiconductor memory (not illustrated).

The input acceptor 601 accepts feature information on the specification of a circuit to be designed. Specifically, the input acceptor 601 accepts an input of the feature information through an operation by a designer on, for example, an input device such as the keyboard 307, the mouse 308, or a touch-panel type display 309. As described above, the feature information is information obtained from, for example, the RTL netlist 203, a netlist after logic synthesis, timing constraint information, or the like. As the feature information, information such as a name of an FPGA, a maximum clock frequency, a number of clocks used in a circuit, and a maximum number of gate stages, or the like may be exemplified. An example in which the feature information is accepted will be described later with reference to FIG. 7.

The information processing apparatus 100 may perform not only acceptance of the feature information itself, but also extraction of feature information from various types of information on a target circuit. Specifically, the input acceptor 601 accepts an input of information on the design of a target circuit such as the RTL netlist 203, the timing constraint information 204, and the like. Then, the extractor 602 extracts feature information on the specification of the circuit to be designed from the accepted RTL netlist 203, the accepted timing constraint information 204, and the like. An example in which the RTL netlist 203 and the timing constraint information 204 are accepted and feature information thereof is extracted will be described later with reference to FIG. 8.

The generator 603 generates, for example, combinations of parameter values that may be set for each of a plurality of parameters. For example, it is assumed that the device name included in the accepted feature information is "AB", the maximum clock frequency is "100 [MHz] or less", the number of clocks is "5 or less", and the maximum number of logic stages is "10 or less". Since the feature information does not include the usage rate, the information processing apparatus 100 assumes that the usage rate is "less than 50". When various constraints do not converge when a target circuit is configured in an FPGA in accordance with an expected correct solution determined with the assumption that the usage rate is "less than 50", the information processing apparatus 100 may determine an expected correct solution again by assuming that the usage rate is "50 or more".

In the machine learning DB 201 illustrated in FIG. 4, there are five types of parameters, and there are 48 (2×2×2×2×3) combinations of parameter values.

By referring to the machine learning DB 201, the calculator 604 calculates for each of the plurality of combinations of parameter values, a sum (total vote count) of vote counts associated with values set for each of the plurality of parameters included in the combinations with respect to the feature information accepted by the input acceptor 601. The plurality of combinations of parameter values are generated by the generator 603.

Specifically, for each of the plurality of combinations of parameter values generated by the generator 603, the calculator 604 searches for the vote counts associated with respective parameter values included in the combinations with respect to the accepted feature information, by referring to, for example, the machine learning DB 201. Then, the calculator 604 calculates a sum of the detected vote counts for each combination of parameter values. Accordingly, the total vote count is obtained for each combination of parameter values.

Then, the output unit 606 outputs several combinations of parameter values, among the plurality of combinations of parameter values, on the basis of the total vote counts. As the output format, an output to the display 309, an output to an external device over the network 310, or an output to a storage device such as the ROM 302, the RAM 303, the disk 305, or a semiconductor memory (not illustrated) may be exemplified. Specifically, the output unit 606 may output, for example, combinations of parameter values for which the total index value is equal to or larger than a predetermined threshold value. Specifically, the output unit 606 may output a predetermined number of combinations of parameter values in descending order of the total vote count among the plurality of combinations of parameter values. The predetermined number is, for example, a predetermined value, and may be stored in the storage unit 610 or the like. The predetermined number is, for example, a value accepted by the input acceptor 601. An example in which the predetermined number of combinations of parameter values are output will be described later with reference to FIG. 9.

Next, a case where a performance factor which a designer wants to prioritize is specified will be described. First, the input acceptor 601 accepts an input of identification information of any one of a plurality of performance factors of a target circuit. The plurality of performance factors may include timing, area/power consumption, and the like.

Then, the setting unit 605 sets one of parameter values included in the combination of parameter values on the basis of the calculated total index value, among the plurality of combinations of parameter values, as a value associated with the accepted identification information, by referring to the parameter conversion table 202. For example, when "timing" is accepted as identification information of the performance factor, the setting unit 605 sets the value of the parameter "Remove Duplicate Registers" included in the predetermined number of combinations of parameter values, to "Off". Accordingly, when the value of "Remove Duplicate Registers" is set as "On", the value is converted into "Off". When the value of "Remove Duplicate Registers" is set as "Off", the value remains "Off". The setting unit 605 sets the value of "Auto Register Duplication" to "On". Accordingly, when the value of "Auto Register Duplication" is set as "Off", the value is converted into "On". When the value of "Auto Register Duplication" is set as "On", the value remains "On".

The output unit 606 outputs the combination of parameter values after the setting. The output format may be the same as that as described above, and a detailed description thereof will be omitted. An example in which the value of the parameter "Remove Duplicate Registers" included in the predetermined number of combinations is set to "Off" will be described later with reference to FIG. 10.

As illustrated in FIG. 2, when a target circuit is configured in an FPGA and each performance factor satisfies the constraint, the vote counts for the respective parameter values used for causing the target circuit to be configured in the FPGA may be updated. Specifically, the input acceptor 601 accepts, for example, the update of the vote counts associated with feature information and the parameter values used for causing the target circuit to be configured in the FPGA. For example, after completing the design of the target circuit for the FPGA, the designer inputs the update of the vote counts associated with the feature information and the parameter values used for causing the target circuit to be configured in the FPGA, through an input device such as the keyboard 307 or the mouse 308.

When the input acceptor 601 accepts the update of the vote counts associated with the feature information and the parameter values used for causing the target circuit to be configured in the FPGA, the registration unit 607 updates the vote counts by referring to the machine learning DB 201. An example in which the vote counts are updated will be described later with reference to FIG. 11.

Figure 7:
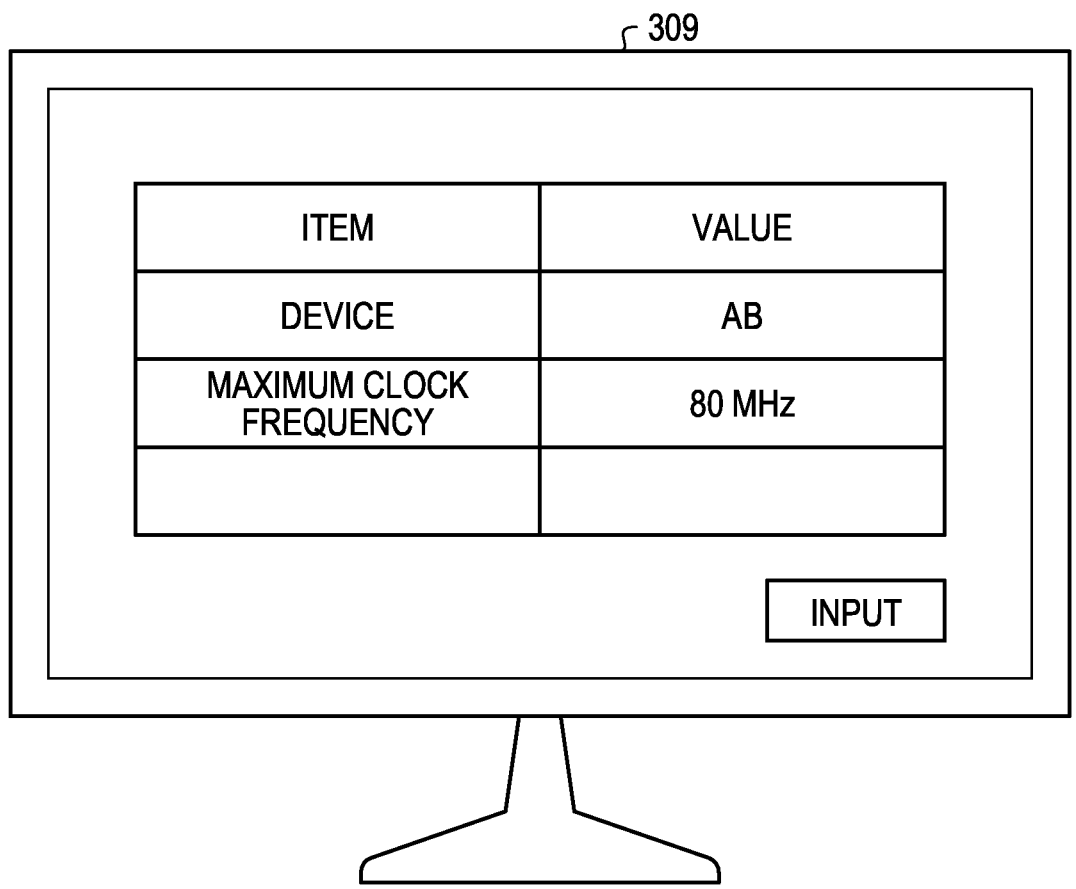
FIG. 7 is a diagram illustrating an example of acceptance of feature information.

FIG. 7 is a diagram illustrating an example of acceptance of feature information. For example, the input acceptor 601 accepts an input of information on each item related to a target circuit, which is displayed on the display 309, through an operation input by a designer. Accordingly, the input acceptor 601 accepts the feature information.

Figure 8:
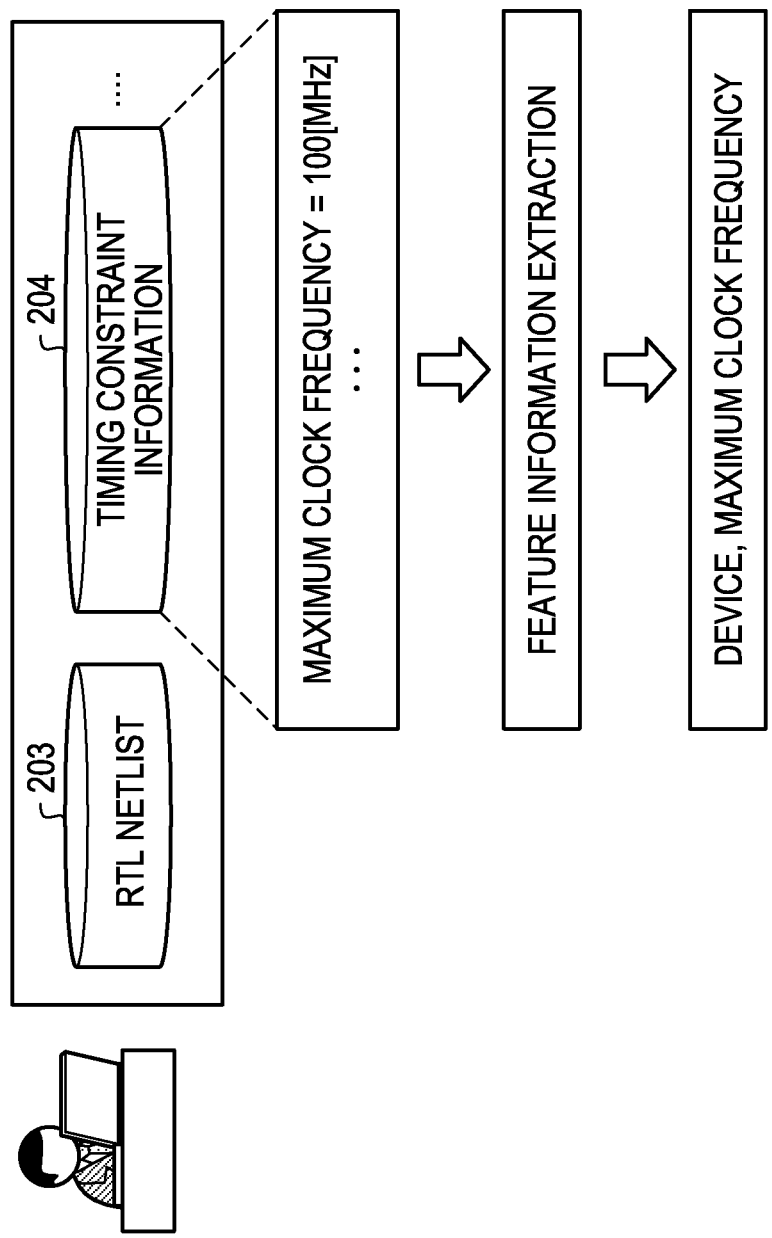
FIG. 8 is a diagram illustrating an example of extraction of feature information.

FIG. 8 is a diagram illustrating an example of extraction of feature information. The input acceptor 601 accepts an input of information on a design of a target circuit, such as the timing constraint information 204, the RTL netlist 203 indicating cells of a circuit to be designed and the connection relationship between the cells, and the like. Then, the extractor 602 extracts feature information on the specification of the circuit to be designed from the accepted RTL netlist 203, the accepted timing constraint information 204, and the like. In the timing constraint information 204, for example, a maximum clock frequency or the like is described. The RTL netlist 203 includes, for example, information such as a maximum number of gate stages.

FIG. 9 is a diagram illustrating an example of calculation and sorting of the total vote counts. For each of a plurality of combinations generated by the generator 603, the calculator 604 sums the vote counts associated with the feature information accepted by the input acceptor 601 and the parameter values included in the relevant combination of parameter values, for example.

As described above, there are 48 combinations of parameter values. The calculator 604 calculates the total vote count for each of the 48 combinations of parameter values. The output unit 606 outputs first to third combinations of parameter values in the descending order of the total vote count, among the 48 combinations of parameter values.

Figure 10:
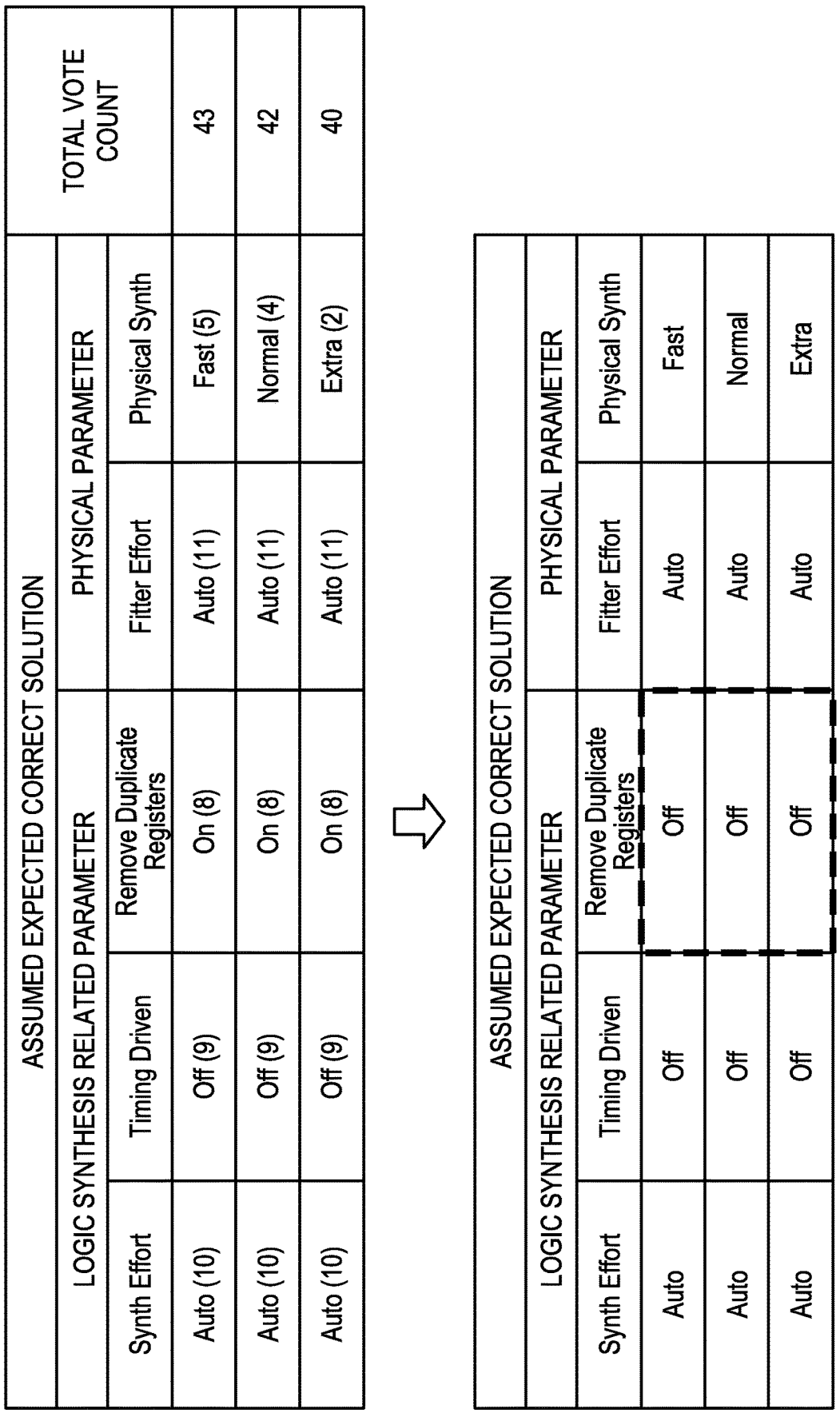
FIG. 10 is a diagram illustrating an example of conversion of a parameter value when a performance factor to be prioritized is a timing.

FIG. 10 is a diagram illustrating an example of conversion of a parameter value when a performance factor to be prioritized is a timing. The setting unit 605 sets the value of the parameter "Remove Duplicate Registers" to "Off". Accordingly, "On" as the value of the parameter "Remove Duplicate Registers" is converted into the value of "Off".

Although not illustrated, the value of the parameter "Auto Register Duplication" is set to "On" by the setting unit 605.

Figure 11:
FIG. 11 is a diagram illustrating an example of update of a machine learning DB.

FIG. 11 is a diagram illustrating an example of update of the machine learning DB. The input acceptor 601 accepts an input of a combination of parameter values set for the respective parameters used for configuring a target circuit in an FPGA. Here, the value of the parameter "Synth Effort" is "Auto". The value of the parameter "Timing Driven" is "Off". The value of the parameter "Remove Duplicate Registers" is "Off". The value of the parameter "Fitter Effort" is "Auto". The value of the parameter "Physical Synth" is "Fast".

The registration unit 607 increases, by 1, the vote count associated with the feature information, and the parameter values included in the accepted combination of parameter values, by referring to the machine learning DB 201. The registration unit 607 updates, for example, the vote count on "Auto" of the parameter "Synth Effort" from "10" to "11". The registration unit 607 updates, for example, the vote count on "Off" of the parameter "Timing Driven" from "9" to "10". The registration unit 607 updates, for example, the vote count on "Off" of the parameter "Remove Duplicate Registers" from "3" to "4". The registration unit 607 updates, for example, the vote count on "Auto" of the parameter "Fitter Effort" from "11" to "12". The registration unit 607 updates, for example, the vote count on "Fast" of the parameter "Physical Synth" from "5" to "6".

Figure 12:
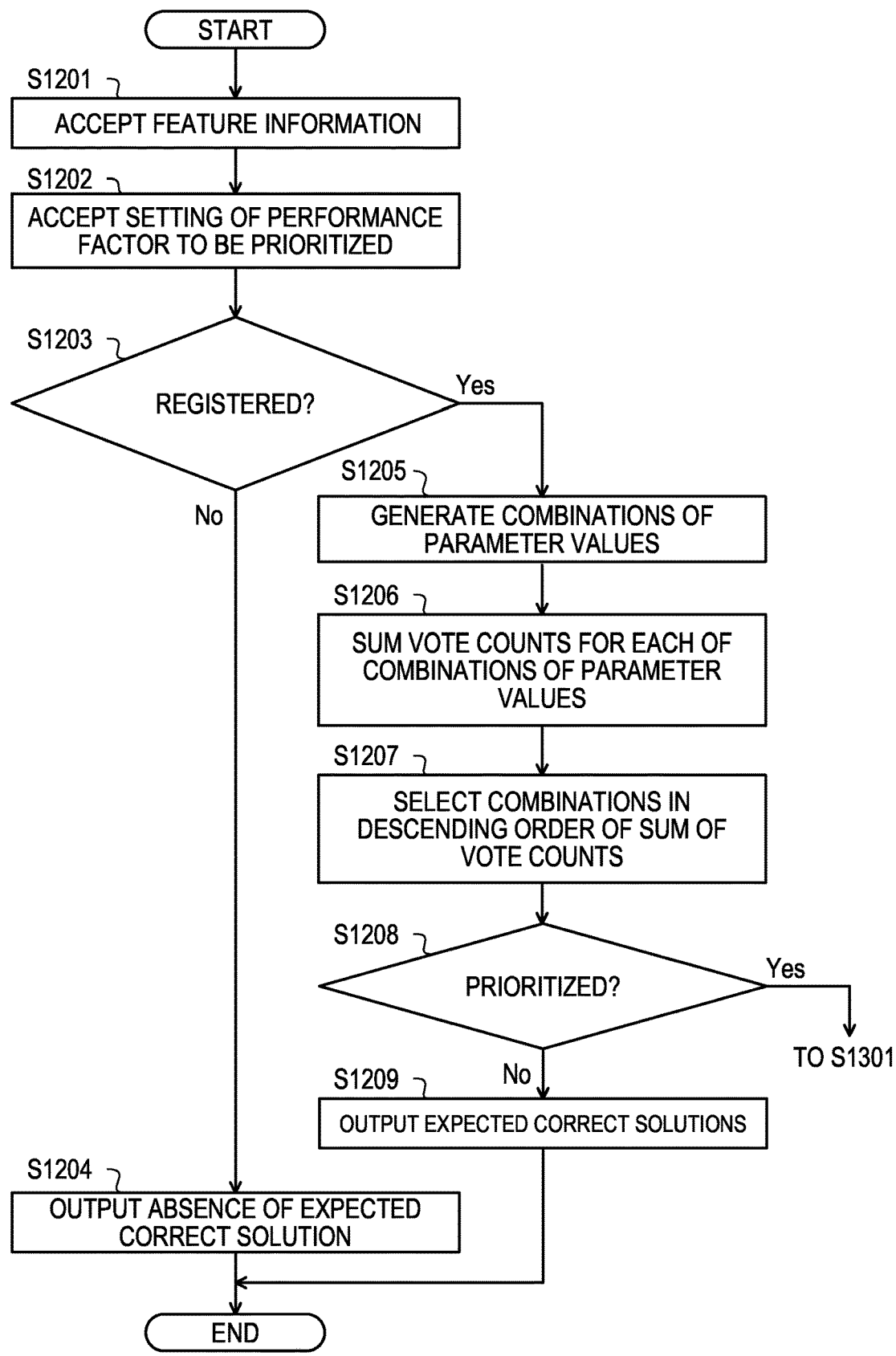
FIG. 12 is a flowchart illustrating an exemplary procedure of design support processing performed by the information processing apparatus.
Figure 13:
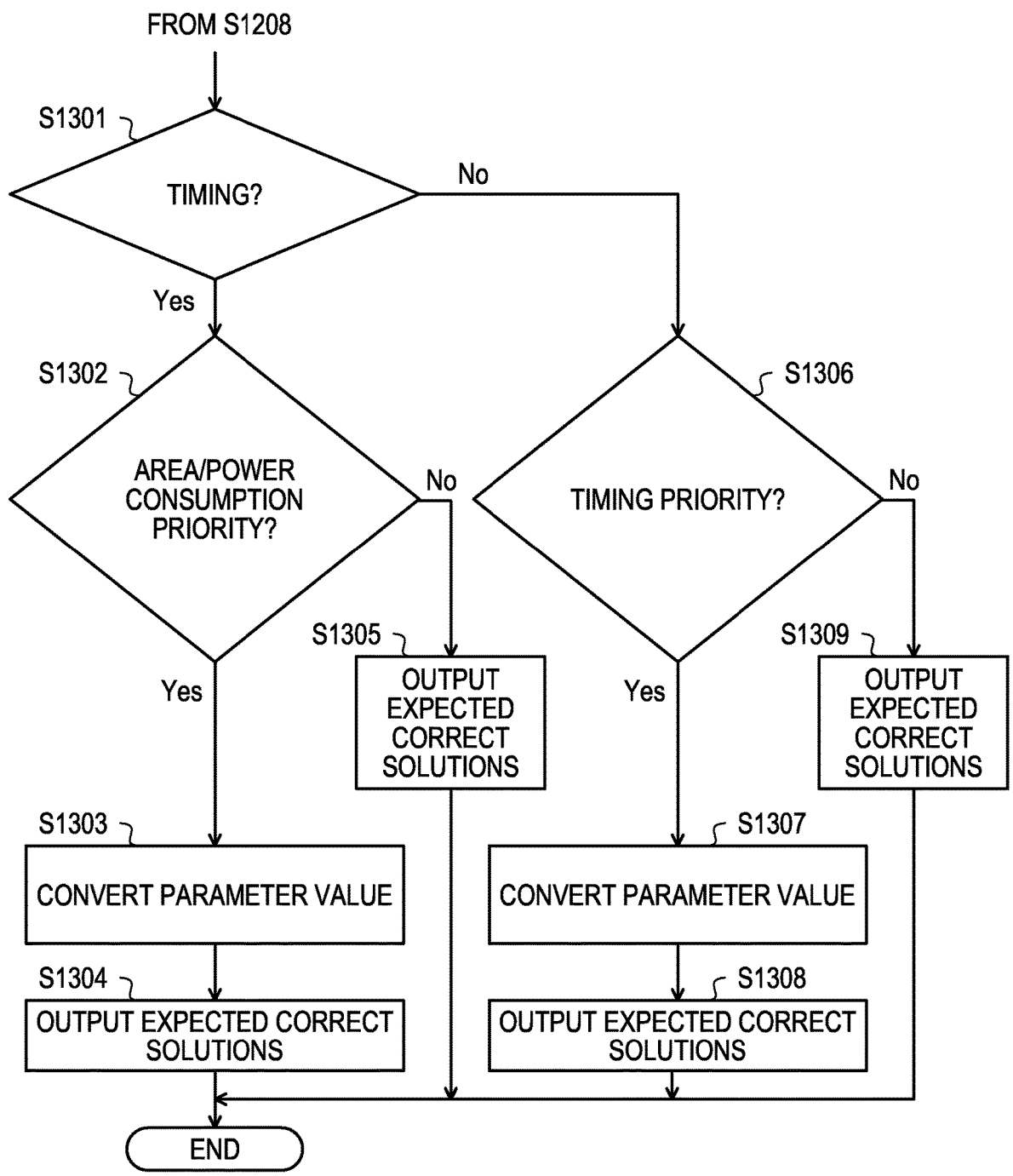
FIG. 13 is a flowchart illustrating an exemplary procedure of design support processing performed by the information processing apparatus.

FIGS. 12 and 13 are flowcharts illustrating an exemplary procedure of a design support processing performed by the information processing apparatus. First, in FIG. 12, the information processing apparatus 100 accepts feature information (S1201). In S1201, the acceptance of the feature information by the information processing apparatus 100 indicates that, for example, the above-described input acceptor 601 accepts the input of the feature information. Alternatively, in S1201, the acceptance of the feature information by the information processing apparatus 100 indicates that the extractor 602 extracts the feature information from the RTL netlist 203 or the timing constraint information 204 accepted by the input acceptor 601.

Next, the information processing apparatus 100 accepts the setting of a performance factor to be prioritized (S1202). In S1202, the acceptance of the setting of the performance factor to be prioritized by the information processing apparatus 100 indicates that the input acceptor 601 accepts identification information of the performance factor to be prioritized. For example, the information processing apparatus 100 accepts an input of identification information such as "timing", "area/power consumption", or the like. When there is no performance factor to be prioritized, the designer may input "none" or the like. The accepted identification information of the performance factor to be prioritized is stored in the storage unit 610 or the like.

The information processing apparatus 100 determines whether the extracted feature information is already registered in the machine learning DB 201 (S1203). When it is determined that the extracted feature information is not yet registered in the machine learning DB 201 (S1203: No), the information processing apparatus 100 outputs absence of an expected correct solution (S1204), and ends the procedure. The expected correct solution indicates a combination of parameter values, which serves as a candidate for an optimal solution. In S1204, the information processing apparatus 100 outputs, for example, the absence of the expected correct solution to the display 309 or the like in order to notify the designer of the absence of the expected correct solution.

When it is determined that the extracted feature information is already registered in the machine learning DB 201 (S1203: "Yes"), the information processing apparatus 100 generates combinations of parameter values (S1205). The information processing apparatus 100 sums the vote counts associated with the feature information and the respective parameter values, for each of the generated combinations of parameter values (S1206).

The information processing apparatus 100 selects, as expected correct solutions, a predetermined number of combinations of parameter values, from the first combination, in the descending order of the sum of vote counts (S1207). The information processing apparatus 100 determines whether the performance factor to be prioritized is set (S1208). When it is determined that the performance factor to be prioritized is not set (S1208: "No"), the information processing apparatus 100 outputs the selected expected correct solutions (S1209). When it is determined that the performance factor to be prioritized is set (S1208: "Yes"), the information processing apparatus 100 proceeds to S1301 illustrated in FIG. 13.

In FIG. 13, the information processing apparatus 100 determines whether the set performance factor to be prioritized is a timing (S1301). When it is determined that the performance factor to be prioritized is a timing (S1301: "Yes"), the information processing apparatus 100 determines whether there is a parameter value of the area/power consumption priority in the expected correct solutions by referring to the parameter conversion table 202 (S1302). When it is determined that there is a parameter value of the area/power consumption priority in the expected correct solutions (S1302: "Yes"), the information processing apparatus 100 converts the parameter value of the area/power consumption priority by referring to the parameter conversion table 202 (S1303). Then, the information processing apparatus 100 outputs the converted expected correct solutions (S1304), and ends the procedure.

When it is determined that there is no parameter value of the area/power consumption priority in the expected correct solutions (S1302: "No"), the information processing apparatus 100 outputs the expected correct solutions (S1305), and ends the procedure.

In S1301, when it is determined that the performance factor to be prioritized is not a timing (S1301: "No"), the information processing apparatus 100 determines whether there is a parameter value of the timing priority in the expected correct solutions (S1306). When it is determined that there is a parameter value of the timing priority in the expected correct solutions (S1306: "Yes"), the information processing apparatus 100 converts the parameter value of the timing priority by referring to the parameter conversion table 202 (S1307). The information processing apparatus 100 outputs the converted expected correct solutions (S1308), and ends the procedure.

When it is determined that there is no parameter value of the timing priority in the expected correct solutions (S1306: "No"), the information processing apparatus 100 outputs the expected correct solutions (S1309), and ends the procedure.

As described above, the information processing apparatus 100 outputs combinations of parameter values, which serve as candidates for an optimal solution, on the basis of the total index value calculated for each of a plurality of combinations of parameter values by referring to index values of respective parameter values of an FPGA, which are stored in the machine learning DB and correspond to circuit features. As described above, there are actually about 60 types of parameters, and seven values may be set for some parameters. Therefore, the information processing apparatus 100 may output some combinations that serve as candidates for an optimal solution from among all the combinations of parameter values that may be set for the parameters, thereby facilitating acquisition of an optimal solution that allows a performance factor of a target circuit to satisfy a constraint. The information processing apparatus 100 may facilitate obtaining an optimal solution within a short time regardless of the proficiency of a designer.

The information processing apparatus 100 outputs a predetermined number of combinations in descending order of the calculated total vote count, among a plurality of combinations. Accordingly, the information processing apparatus 100 may obtain combinations that serve as candidates for an optimal solution on the basis of the past use of the parameter values.

The information processing apparatus 100 accepts an input of identification information of one of a plurality of performance factors of a target circuit, and sets a parameter value included in the combinations extracted on the basis of the calculated total index value, as a value associated with the accepted identification information of the performance factor. Accordingly, the information processing apparatus 100 may convert a parameter value not matching the performance factor to be prioritized into a parameter value matching the performance factor to be prioritized.

The index value is a value related to the frequency of use of a parameter value. Accordingly, the information processing apparatus 100 may provide, as an optimal solution, a combination of parameter values with a high frequency of being used for designing a circuit having the same feature information as the feature information of the target circuit. Therefore, the information processing apparatus 100 may facilitate obtaining an optimal solution regardless of the proficiency of a designer.

The design support method described in the present embodiment may be implemented by causing a computer such as a personal computer or a workstation to execute a design support program prepared in advance. The design support program is written on a computer-readable recording medium such as a magnetic disk, an optical disk, or a universal serial bus (USB) flash memory, read from the recording medium by a computer, and executed by the computer. The design support program may be distributed over a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiment of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes at least one computer to execute a process, the process comprising:
   accepting specification information of a target circuit to be designed;
   storing first correspondence information in which a plurality of parameter values correspond to respective index values for each piece of the specification information of respective circuits to be configured in an integrated circuit, the parameter values being alternatives of values to be set for respective parameters used for causing each of the circuits to be configured in the integrated circuit, the index values being related to frequencies of use of the respective parameter values;
   calculating, for each of a plurality of combinations of the parameter values related to the specification information, a sum of the index values corresponding to respective parameter values included in each of the combinations of parameter values based on the first correspondence information;
   selecting a combination of the parameter values having a highest calculated sum from among the plurality of combinations of the parameter values;
   setting the parameters of the respective circuits to a selected combination of the parameter values obtained by the selecting; and
   controlling production of the integrated circuit based on the parameters of the respective circuits.

2. The non-transitory computer-readable recording medium according to claim 1, the process further comprising:
   accepting identification information of a performance factor to be prioritized;
   referring to second correspondence information in which identification information of each of a plurality of performance factors corresponds to one of the plurality of parameter values;
   updating a parameter value included in the selected combination of parameter values to a performance parameter value associated with the performance factor to be prioritized; and
   setting the parameters of the respective circuits to the selected combination of the parameter values after the updating.

3. The non-transitory computer-readable recording medium according to claim 1, wherein the index values indicate use frequencies of the respective parameter values.

4. A circuit development method, comprising:
   accepting, by a computer, specification information of a target circuit to be designed;
   storing first correspondence information in which a plurality of parameter values correspond to respective index values for each piece of the specification information of respective circuits to be configured in an integrated circuit, the parameter values being alternatives of values to be set for respective parameters used for causing each of the circuits to be configured in the integrated circuit, the index values being related to frequencies of use of the respective parameter values;

calculating, for each of a plurality of combinations of parameter values related to the specification information, a sum of the index values corresponding to respective parameter values included in each of the plurality of combinations of the parameter values based on the first correspondence information;

selecting a combination of parameter values having a highest calculated sum from among the plurality of combinations of the parameter values;

setting the parameters of the respective circuits to a selected combination of the parameter values obtained by the selecting; and controlling production of the integrated circuit based on the parameters of the respective circuits.

5. An integrated circuit development apparatus, comprising:

a memory; and at least one processor, coupled to the memory, configured to:

accept specification information of a target circuit to be designed;

store first correspondence information in which a plurality of parameter values correspond to respective index values in the memory for each piece of the specification information of respective circuits to be configured in an integrated circuit, the parameter values being alternatives of values to be set for respective parameters used for causing each of the circuits to be configured in the integrated circuit, the index values being related to frequencies of use of the respective parameter values;

calculate, for each of a plurality of combinations of parameter values related to the specification information, a sum of the index values corresponding to respective parameter values included in each of the plurality of combinations of the parameter values based on the first correspondence information stored in the memory;

select a combination of parameter values having a highest calculated sum from among the plurality of combinations of the parameter values;

set the parameters of the respective circuit to a selected combination of the parameter values; and control production of the integrated circuit based on the parameters of the respective circuits.

* * * * *